Feb. 14, 1961     I. F. FAUSEK ET AL     2,971,742
GAS BURNING TORCHES
Original Filed June 18, 1956     2 Sheets-Sheet 1
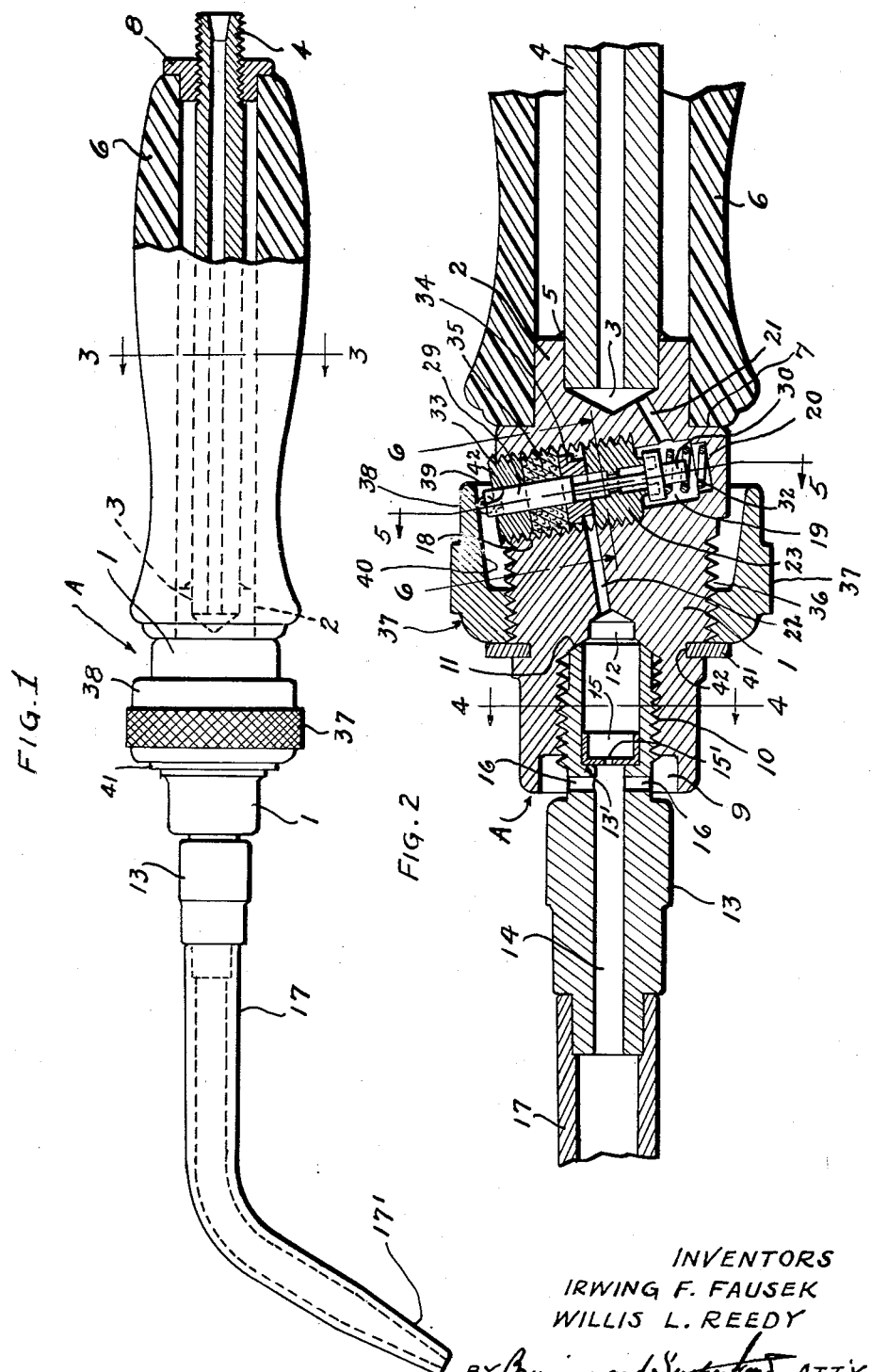
INVENTORS
IRWING F. FAUSEK
WILLIS L. REEDY

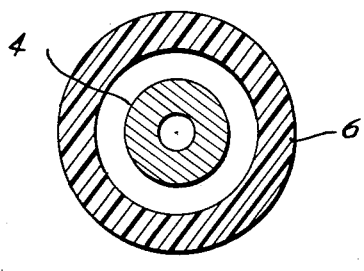
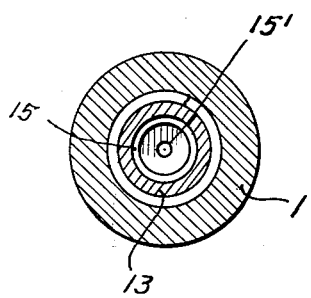
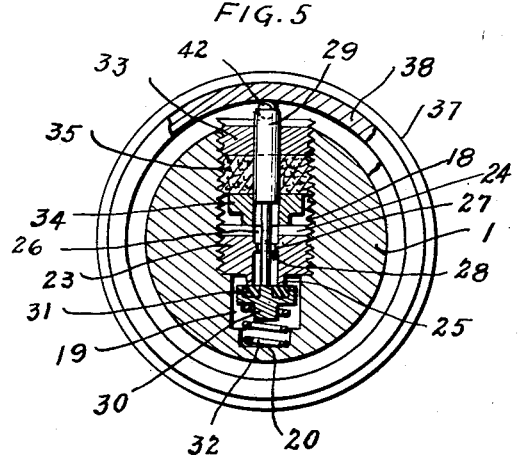
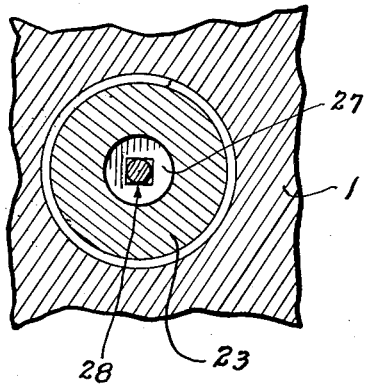

United States Patent Office 2,971,742
Patented Feb. 14, 1961

2,971,742
GAS BURNING TORCHES

Irwing F. Fausek, Clayton, and Willis L. Reedy, St. Louis, Mo., assignors to Modern Engineering Company, St. Louis, Mo., a corporation of Missouri Continuation of application Ser. No. 591,938, June 18, 1956. This application June 18, 1959, Ser. No. 821,317

4 Claims. (Cl. 251—340)

This application is a continuation of our co-pending application Serial No. 591,938, filed June 18, 1956, now abandoned.

This invention relates generally to gas burning torches and more specifically to such torches which are intended particularly for use in brazing and soldering operations.

Torches of the type referred to are conventionally provided with a tip bent at an angle to the axis of the handle; and adjacent the handle there is a valve for controlling the flow of fuel gas from the supply toward the tip. As delivered by the manufacturer, the tip is usually so oriented with reference to the valve that the manipulating means for the valve is located in a position convenient for manipulation by the thumb or forefinger when the torch is held in a manner such that the tip is directed in the customary manner; but as the tips require frequent replacement, it happens, more often than not, that the torch is not so orientable in the hand of an operator that the valve may be manipulated with the tip in the working direction. Hence the torch must be shifted about the axis of the handle between a position whereat the valve is manipulatable and a position whereat the tip is directed in the working direction. This involves the waste of both time and fuel.

It is therefore the main object of the invention to provide a torch of the character described wherein the valve may be conveniently operated irrespective of the position of the tip.

Another object of the invention is to provide such a torch with a valve mechanism which is positive in its action, cheap to manufacture, of long operative life, and easily disassembled for repair.

Other objects will become apparent to those skilled in the art when the following description is read in connection with the accompanying drawings, in which:

Figure 1 is a side elevation of the improved torch of this invention with portions thereof shown in section;

Figure 2 is an enlarged, fragmentary, longitudinal section of a portion of the torch;

Figure 3 is a cross-section taken on line 3—3 of Figure 1;

Figure 4 is a cross-section taken on line 4—4 of Figure 2;

Figure 5 is a cross-section taken on line 5—5 of Figure 2; and

Figure 6 is a horizontal, fragmentary section taken on line 6—6 of Figure 2.

The present invention contemplates that a torch of the character described have a valve operating part so arranged that the user may conveniently manipulate the same, without shifting the position of the torch in his hand, throughout a wide range of angular positions. Specifically, where it is desired that the valve be conveniently operable throughout a full range of 360° about the axis of the torch handle, the valve operating part may be in the form of a movable sleeve embracing the torch body adjacent the end of the handle so that, irrespective of the angular position of the handle in the hand, the sleeve may be manipulated by the thumb or forefinger. Such a sleeve is movable relative to the valve mechanism either longitudinally or circumferentially or both, and is so interconnected with the valve mechanism as to move the latter in response to movement of the former.

In the drawings wherein is shown for the purpose of illustration, merely, one embodiment of the invention, A designates the improved torch generally, said torch A including a torch body portion 1. The torch body portion is provided at its rear portion with a rearwardly projected extension 2, said extension 2 being provided with a cavity 3 which receives the forward end portion of a tubular fuel conducting member 4, said fuel conducting member being soldered, or otherwise secured to the torch body portion as indicated by the reference character 5 in Figure 2. Mounted on the exterior of the extension 2 by having its forward end portion embracing said extension 2 is a handle 6 which may be formed of plastic or wood, or some other suitable heat insulating material, the handle abutting against a shoulder 7 formed on the torch body portion and having a bore formed longitudinally therethrough through which said fuel conducting member extends. The rear end portion of the fuel conducting member 4 is externally screwthreaded and mounted on said screwthreaded portion of said fuel conductor member 4 is a nut 8 which abuts against the rear end of said handle and forces its forward end into close contact with the shoulder 7 so as to secure said handle in place. The fuel conducting member extends beyond the nut 8 and this extended portion of said fuel conducting member which is screwthreaded receives a hose coupling (not shown) which connects to the fuel conducting member 4 a hose (not shown) which leads from a source of fuel supply (not shown) to the torch.

At the forward end of the torch body portion 1 an enlarged cavity 9 is formed which is open at the forward end of said body portion, as shown in Figure 2, and extended rearwardly of the inner wall of said cavity 9 and of said torch body portion is a screwthreaded bore 10, said bore being tapered at 11 and at its rear end and merging into an opening 12 which is of reduced diameter relative to the diameter of the bore 10 Screwthreadedly mounted in the bore 10 of the torch body portion 1 is the rear end portion of a coupling member 13 which has a bore 14 formed longitudinally therethrough, there being an annular shoulder 13' within said bore adjacent to the rear end of the coupling member 13. Arranged within the bore 14 of the coupling member 13 is a dish-shaped nozzle element 15 having a discharge orifice 15' formed therethrough, said nozzle element having an annular marginal flange which contacts with the face of the bore, and said coupling member being provided with a plurality of air intake passageways 16 formed through the wall thereof which are open to the atmosphere at their outer ends and communicate with the bore 14 of the coupling member at their inner ends. The coupling member is provided with a forward portion of slightly reduced diameter which is embraced by an end portion of a torch tip 17, said tip being of angular formation and having a slightly tapered forward end or discharge portion 17'.

The torch body portion 1 has formed therein an opening 18 whose major axis is extended at an angle relative to the minor axis of the torch body portion 1, the opening 18 throughout a majority of the length thereof measuring downwardly from the top thereof being of greater diameter and being internally screwthreaded, said portion of greater diameter merging into an intermediate opening portion 19 of less diameter having a smooth wall portion, and this intermediate opening portion merging into a lower opening portion 20, which is of still smaller diameter and which has a smooth wall also. The cavity 3 is placed in communication with the portion 19 of the opening 18 by means of a passageway 21, and the opening 12 is placed in communication with the opening 18 by means of a passageway 22. At the lower end of the internally screwthreaded upper portion of the opening 18 is screwthreadedly arranged a valve member 23 which is provided with a transverse groove 24 that extends (like a screwdriver slot) entirely across valve member 23 from one to the opposite side thereof at the top thereof, said valve member being provided at its lower face with a downwardly projecting valve seat 25. The valve member 23 is provided with a bore 26 which extends from top to bottom thereof, and this bore is provided with a transverse partition 27, said partition having a non-circular opening 28 formed therethrough as is shown to good advantage in Figure 6.

A valve stem 29 is arranged to extend longitudinally of the opening 18, said valve stem being provided with a portion of reduced diameter that extends through the opening 28, making engagement therewith at the four points of tangence so that the opening 28 serves not only to guide the stem, but also to provide gas ports at its corners. At its lower end, the reduced portion of the valve stem 29 has arranged a valve head 30 which is provided with an annular recess that receives an annular valve seat 31 formed of suitable resilient material, such as synthetic rubber, so as to make good, tight contact with said valve seat 25. The valve head 30 is forced into tight contact engagement with the valve seat 25 of the valve member 23 by a coil spring 32 that contacts at its upper end with the valve head 30 and at its lower end with the base of the lower opening portion 20. The valve stem is embraced adjacent to the upper portion thereof by a nut 33 having a screwdriver slot at its top, and lower down on said valve stem, said valve stem is embraced by a collar 34 which has a portion of reduced outside diameter resting on the top face of valve member 23, as shown clearly in Figure 6. A body of any suitable packing material 35, which serves to prevent gas leakage outwardly along the valve stem, is interposed between the nut 33 and the upper surface of said collar 34.

A portion of the body portion 1 of the torch A is externally screwthreaded as indicated at 36, and screwthreadedly mounted on said externally screwthreaded portion is an internally threaded sleeve 37 having an extended portion 38 provided with a bore 39 which is of tapered formation and includes an annular, inclined face 40 which inclines rearwardly and outwardly from front to back, as shown in Figure 2. The sleeve 37 is provided with a raised, knurled, annular face which facilitates rotation of the nut by hand, and a lock ring 41 which is seated in a recess and serves as an abutment that limits forward movement of the sleeve 37 with respect to the screwthreaded portion of the body portion 1. The upper portion of the valve stem is provided with a ball 42, the material of the upper portion of the valve stem being peened over to retain the ball in place free for rotation relative to the valve stem and in contact with the inclined face 40 of the sleeve 37.

In the use of the improved torch disclosed herein, the sleeve 37 is rotated in the proper direction to cause said sleeve to travel axially of the body portion 1, and as a result of such travel of the sleeve, the inclined face 40 of the nut depresses the valve stem 29 and moves the valve head 30 away from the valve seat 25 of the valve member 23 and permits fuel gas to pass through the bore of the valve member 23 and through the non-circular opening 28 of the partition 27 within said bore through the groove 24 at the top of the valve member 23 and about the lower reduced diameter-end of collar 34 into the passageway 22, and into the opening 12. From the opening 12, the fuel gas passes into the bore of the coupling member 13 whence said fuel gas passes in the form of a jet through the orifice 15' of the nozzle element 15 and draws air through the air passageways for mixture with the fuel gas, and the admixture of fuel gas and air passes through coupling member 13 and tip 17 to the discharge end of the tip where a flame consumes said admixed fuel gas and air.

While the embodiment of invention shown in the accompanying drawing is provided with a poppet type valve and with a valve operating sleeve which, because of its screwthreaded mounting, move both rotationally and axially relative to the handle, it will be understood that the invention is equally applicable to other types of valves, such as the common slide and rotary mechanisms when suitably connected to impart the desired movement thereto, and that the valve operating sleeve may be slidable axially (without rotation) or may be rotatable (without axial movement) provided, in the latter event, that the inner surface of the sleeve be made eccentric.

Regardless of the diverse mechanical arrangements which will occur to those skilled in the art, the invention accomplishes its object by providing a valve operating member which is in position for manipulation regardless of the angle at which the tip extends, and regardless of whether the user be right-handed or left-handed.

While one complete embodiment of the invention has been disclosed in detail, and several equivalents suggested, it is not to be understood that the invention is limited to the particularized disclosure save as indicated by the appended claims.

Having thus described the invention, what is claimed and desired to be secured by Letters Patent is:

1. A valve comprising a body portion having an obstructible passageway therethrough, a sleeve concentric with said body portion, said sleeve having on its inner surface thread means engaging thread means on the outer surface of said body portion so that said sleeve is spirally movable relative to said body portion, said sleeve having a substantially frusto-conical interior face, and a valve operating member obstructing said passageway and extending outwardly from said body portion and biased into engagement with said frusto-conical interior face so as to be moved with respect to said body portion by spiral movement of said sleeve.

2. A valve comprising a body portion having an obstructible passageway therethrough, a fixed valve seat, a valve stem having a valve head associated therewith and movable therewith into and out of contact with respect to said valve seat, which when the valve head is in contact with the valve seat obstructs the said passageway and a sleeve having on its inner surface thread means engaging thread means on the outer surface of said body portion so that said sleeve is spirally movable relative to said body portion, and said sleeve also having a substantially frusto-conical interior face, said valve stem being biased into engagement with said frusto-conical interior face so as to be moved thereby upon spiral movement of said sleeve.

3. A valve comprising a body portion having an obstructible passageway therethrough, a valve seat member provided with a bore formed therethrough, a partition extending transversely of said bore and an opening formed through said partition, a valve stem having a valve head associated therewith and movable therewith into and out of contact with respect to said valve seat member, which when the valve head is in contact with the valve seat obstructs the said passageway, said valve stem having a portion which extends through said opening of said partition, and a sleeve mounted on said body portion, said sleeve having on its inner surface thread means engaging thread means on the outer surface of said body portion so that said sleeve is spirally movable relative to said body portion, and said sleeve also having a substantially frusto-conical face engaging said valve stem so as to move said valve head relative to said valve seat upon rotation of said sleeve.

4. Valve means for gas-burning torches, said valve means comprising a body having an obstructible passageway formed therethrough, a valve structure disposed in said body and adapted to control the flow of gas through said passageway, said valve structure having an actuating element protruding from said body substantially transversely thereof, and a sleeve movably mounted with respect to said body, said sleeve having on its inner surface thread means engaging thread means on the outer surface of said body so that said sleeve is spirally movable relative to said body, and said sleeve also having an interior substantially frusto-conical surface, and means biasing said actuating element into contact with said interior substantially frusto-conical surface.

References Cited in the file of this patent

UNITED STATES PATENTS

| | | |
|---|---|---|
| 2,612,337 | Maynard | Sept. 30, 1952 |
| 2,715,512 | Miller | Aug. 16, 1955 |

FOREIGN PATENTS

| | | |
|---|---|---|
| 77,740 | Denmark | June 28, 1954 |